s011352087B2

(12) United States Patent
Keller

(10) Patent No.: US 11,352,087 B2
(45) Date of Patent: Jun. 7, 2022

(54) SAFETY LIGHT

(71) Applicant: John Keller, Ellicott City, MD (US)

(72) Inventor: John Keller, Ellicott City, MD (US)

(*) Notice: Subject to any disclaimer, the term of this patent is extended or adjusted under 35 U.S.C. 154(b) by 0 days.

(21) Appl. No.: 17/001,375

(22) Filed: Aug. 24, 2020

(65) Prior Publication Data
US 2021/0129932 A1 May 6, 2021

Related U.S. Application Data

(60) Provisional application No. 62/891,163, filed on Aug. 23, 2019.

(51) Int. Cl.
B62J 6/04 (2020.01)
F21V 21/088 (2006.01)
F21V 33/00 (2006.01)
F21W 107/13 (2018.01)
F21V 21/116 (2006.01)

(52) U.S. Cl.
CPC ............ B62J 6/04 (2013.01); F21V 21/0885 (2013.01); F21V 33/008 (2013.01); F21V 21/116 (2013.01); F21W 2107/13 (2018.01)

(58) Field of Classification Search
CPC ....... B62J 6/04; F21V 21/0885; F21V 33/008; F21V 21/116; F21W 2107/13; F21W 2121/06; A41D 2400/00; A41D 2600/00; A42B 3/0446; A42B 3/044; A42B 3/0453
USPC ........................................ 362/473, 103, 108
See application file for complete search history.

(56) References Cited

U.S. PATENT DOCUMENTS

| 3,122,736 | A | * | 2/1964 | Weber | B63C 9/20 340/815.4 |
| 3,720,918 | A | * | 3/1973 | Perl | A41F 9/002 340/432 |
| 5,379,197 | A | * | 1/1995 | Graves | F41B 15/00 2/158 |
| 5,418,696 | A | * | 5/1995 | Izzo, Sr. | B62J 6/015 362/473 |
| 5,595,441 | A | * | 1/1997 | McGee | F21L 4/04 362/473 |
| 5,690,411 | A | * | 11/1997 | Jackman | A41D 13/01 362/103 |
| 5,892,445 | A | * | 4/1999 | Tomich | G08B 5/004 340/573.1 |
| 6,024,464 | A | * | 2/2000 | De Vera | A45B 3/04 224/190 |

(Continued)

FOREIGN PATENT DOCUMENTS

GB 2423571 * 8/2006
GB 2479845 * 10/2011

Primary Examiner — Laura K Tso
(74) Attorney, Agent, or Firm — Cargill & Associates, PLLC; Lynn E. Cargill

(57) ABSTRACT

The present invention provides various aspects of a novel safety light that can be attached to a bicyclist or an athlete so as to define a well lit, safe distance to avoid collision by a motorist. The present safety concerns would find advantage in an easy to attach safety light that is much larger, more conspicuous and one that provides greater lumens. It would be desirable for athletes and the sports industry if there was provided an improved safety light system to provide a significant warning to let motorists know the safe distance that any motorist and/or his vehicle needs to avoid so as not to hit the cyclist or athlete.

1 Claim, 11 Drawing Sheets

(56) References Cited

U.S. PATENT DOCUMENTS

| | | | | |
|---|---|---|---|---|
| 6,056,412 | A * | 5/2000 | Atlee | F21L 15/14 |
| | | | | 224/660 |
| 7,232,244 | B2 * | 6/2007 | Naylor | F04B 33/005 |
| | | | | 362/473 |
| 7,568,813 | B2 * | 8/2009 | Barker | F21L 4/04 |
| | | | | 362/103 |
| 8,246,224 | B2 * | 8/2012 | Sherwin | B62J 6/015 |
| | | | | 362/473 |
| 8,905,611 | B2 * | 12/2014 | Connor | F21S 4/00 |
| | | | | 362/554 |
| 9,359,032 | B2 * | 6/2016 | Freiser | B62J 6/04 |
| 10,926,820 | B1 * | 2/2021 | Meyer | B62K 19/40 |
| 2007/0035956 | A1 * | 2/2007 | Topps | G09F 21/045 |
| | | | | 362/473 |
| 2012/0298887 | A1 * | 11/2012 | Stevens | G01B 11/2513 |
| | | | | 250/492.1 |
| 2016/0023703 | A1 * | 1/2016 | Braggin | B62J 6/00 |
| | | | | 362/473 |

* cited by examiner

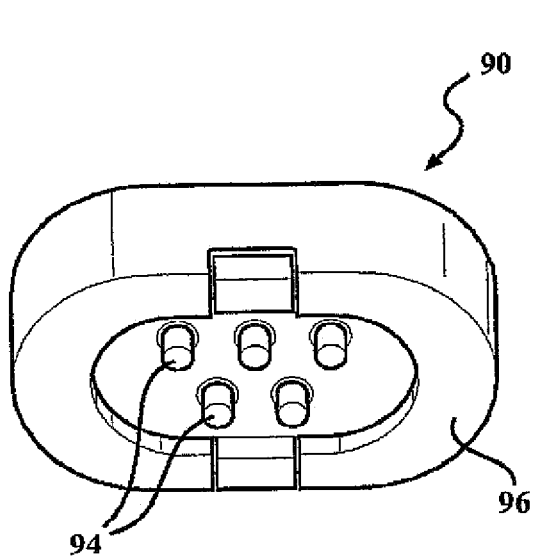 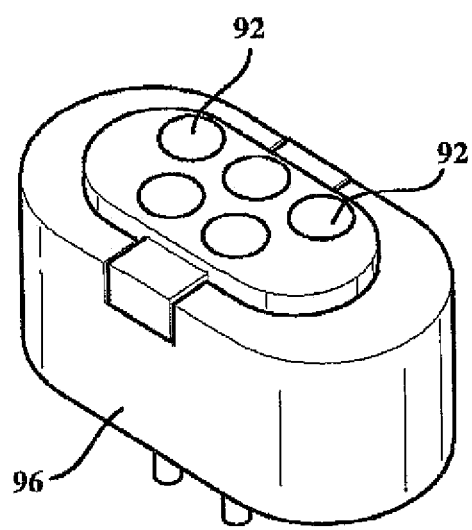
FIG. 10A  FIG. 10B

SAFETY LIGHT

CROSS-REFERENCE TO RELATED APPLICATIONS

This application claims the benefit under 35 U.S.C. 119(e) of U.S. Provisional Application No. 62/891,163 filed on Aug. 23, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a safety light for athletes, methods of manufacturing same, and methods of using same. More particularly, the invention relates to a safety light system for collision avoidance for bicyclists and runners.

2. Description of the Prior Art

COVID 19 has increased the popularity of cycling for an outdoor sport because social distancing occurs naturally. As more cyclists practice the sport, however, more accidents are naturally going to occur. Bicyclists and runners have long had a problem with the dangers of sharing paths with automotive vehicles and motorists. Collisions between an automobile and an athlete, whether the athlete is a bicyclist or a runner, it almost always ends in disaster for the athlete. It is a serious concern that poses extreme dangers to their bodies. In that regard, it is most dangerous at night, although daytime riding or running poses similar issues. Careless or negligent motorists can be alerted to the position of an athlete sharing a roadway, and thus, providing a way of making the motorist aware of the presence of the athlete can go a long way to avoiding a collision.

Previously, athletes have used reflectors and lights to warn motorists about the athletes' position near or on a road. While these reflectors and lights have been used extensively to make motorists aware of the existence of the position of the athlete, most have not served as a collision avoidance mechanism that was sufficient.

Consequently, practitioners of those inventions have become aware of certain problems which are presented by prior art inventions for collision avoidance. One particular problem that has plagued users has been that an insufficient space was defined for collision avoidance.

Biking and running are both fun ways to exercise, get into shape as well as to keep in shape. Also, getting out to enjoy the outdoors and the beautiful weather is good for your mental health. It is pure freedom just to be able to go out your front door, hop on your bike or throw on your running shoes, and go exercise.

With regards to bicycling, in addition to being fairly safe from COVID 19 transmission, Americans are increasingly bicycling to commute while social distancing, for exercise, or just for fun. By law, bicycles on the roadway are vehicles with the same rights and responsibilities as motorized vehicles.

However, there are two (2) reasons why bicyclists and runners may have some fear. The first is that you have to share the road with cars and trucks and that can be very scary and dangerous, especially when they are speeding by and pass very close. The second reason is that visibility of you and your bike on the road are very poor, during the day, and especially at night.

In 2016, there were 840 bicyclists killed in traffic crashes in the United States. An increase from 829 in 2015. As one might expect, when a crash occurs between a motor vehicle and a bicyclist or a runner, the cyclist or runner is most likely to be injured. Surprisingly, most bicycle deaths occurred during the daylight, 51% compared to the night at 45%. Dawn and dusk fatalities made up the difference.

Texting drivers, tired drivers, and distracted drivers can cause serious harm when encountered on the road. This is why it is so important for cyclists to be visible. Making the drivers notice you and to making the drivers give you more room on the road is of huge importance.

When bicycling on the street, motor vehicles have a hard time seeing the bicyclist from the rear. Also, drivers tend to pass extremely close to bikers leaving no margin for safety or error. If the bicyclist or driver should swerve, even slightly, this could be fatal for the cyclist. Many States in the U.S. have laws that require vehicles to pass no closer than 3 feet from the cyclist. Many drivers ignore this law out of ignorance or they do not realize how close they come when passing a bicyclist. Because of their speed, distance and size of a cyclist on his or her bicycle, it is hard for drivers to perceive this safety gap of a mere 3 feet, as they drive by.

However, as a bicyclist, one can "feel" how close a motorist can get when they speed by and this can be very scary, car after car, truck after truck—never knowing which ones will go around you safely and which ones will pass way too close. When you can put out your arm and almost touch the car or truck as it goes by, that is a very big problem and a major safety issue. This is especially true of pick-up truck/SUV drivers who "think" they are passing the cyclist safely, but fail to take into account how far out their side view mirrors extend.

These are the reasons why so many people do not like to bike on the road and these reasons are why a better and safer way to bike and run is needed.

Furthermore, prior art bicycle rear safety lights have been generally relatively small, on the order of 2-3 inches across, and attach directly to the back of the seat post. If they are paying attention, drivers only see a small blinking light on the bike itself which encourages the drivers to not run directly into the back of the bike. However, this does not give drivers any concept of distance and safe margin of space in which the driver should pass the cyclist. Also, because these lights are small and are on the seat post directly under the seat, they provide limited lumens, which makes them especially harder to see for daytime use. Further, they sit lower to the ground and thus become much harder to see.

SUMMARY OF THE INVENTION

In accordance with the above-noted desires of the industry, the present invention provides various aspects, including a novel safety light that can be attached to a bicyclist or an athlete so as to define a safe distance to avoid collision by a motorist. The present invention addresses the abovementioned problems. The present safety concerns would find advantage in a light that is much larger, more conspicuous and one that provides greater lumens. It would be desirable for athletes and the sports industry if there was provided an improved safety light system to provide a significant warning to let motorists know the safe distance that any motorist and/or his vehicle needs to avoid so as not to hit the athlete.

The present invention discloses various aspects of an extended light bar which is attached to the seat post of a bicycle or a runner, such that a lighted bar shows a safe distance for a motorist to avoid encroaching. Collisions can be diminished by the use of the present invention, as motorists will become more aware of the distance needed between the motor vehicle and the athlete. The light bar contains any of a number of LED lights that can be steady lights, flashing lights, or blinking lights, so as to alert a driver that he needs to keep that distance away from the athlete. Such lights can be brightened upon the brakes of the bicycle being activated, or the light could be brightened when a vehicle came too close, or a different sequence of lights could show a turning signal like display, among other functions.

The preferred length is between 1 and 36 inches, preferably something on the order of an 18 inch light bar. Especially advantageous is that it can be adjusted by hand while you are seated on the bike. Such adjustments can be either to swivel to the left of the bike, used primarily for use on U.S.A roads, swivel to the right for European or Foreign left side driving use, or vertically straight-up for bike path use or when on a group ride.

Because the safety rear bike light is adaptable and allows for extending to the side of the bike rider and away from the bike, it forces motor vehicles to give the cyclist a wider margin of safety when passing because the driver has to go around the light and not just the bike itself.

Drivers will instinctually give you more space because they perceive you as being "larger" on the road because the light extends into the roadway and away from your bike and is extremely visible, both during the day and the night. Further, drivers can become more aware of the actions being taken by the cyclist, as the light sequences will signal what is happening to the bicycle.

The present safety light is not only designed for increased visibility from the rear but also because of its unique design, it offers 360 degrees of visibility with the flashing light visible from all sides of the bike—rear, sides and front of the bike.

In that regard, a first aspect of the present invention comprises certain features including an elongated safety light which extends outwardly from either the rear or the front of a bicycle. In this aspect, LED lights are positioned in a light bar extending outwardly from the bicycle at a distance which would help to avoid collision. Further complementary features and aspects include collision sensors to alert the bicyclist to an impending collision so that the bicyclist can maneuver his bicycle out of the way.

Another aspect of the invention has other features including a safety light to be attached to a runner, also for collision avoidance purposes. Similar features to the bicycle aspect for this personal runner application would also be incorporated into this application. Such a light could be attached to the waist of a runner, or it could be a display across the back of the runner.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein;

FIG. 9 is a side elevational view of another aspect of the present invention with a telescopic device;

FIG. 10A is a perspective view of the male side of the feather touch magnetic connector aspect;

FIG. 10B is a perspective view of the female side of the feather touch magnetic connector aspect;

DETAILED DESCRIPTION OF THE INVENTION

Figure 1:
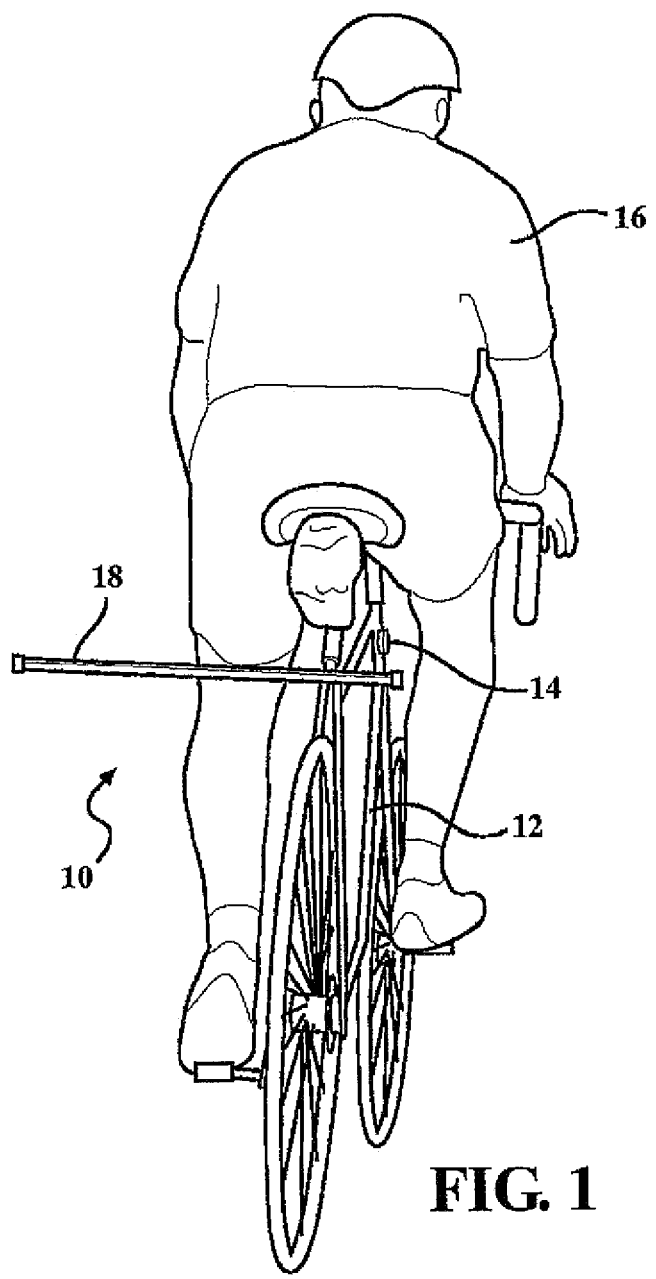
FIG. 1 is an environmental view of a safety light made in accordance with the present invention as attached to the rear of a bicycle.

Referring now to the drawings in detail, FIG. 1 is an environmental view of a safety light made in accordance with the present invention, generally indicated by the numeral 10, which also includes an extended light bar 18 attached to a seat post 14 on bicycle 12. Cyclist 16 is protected from motorists as light bar 18 provides a lighted indicator of the safe passing distance from the bicycle.

Figure 2:
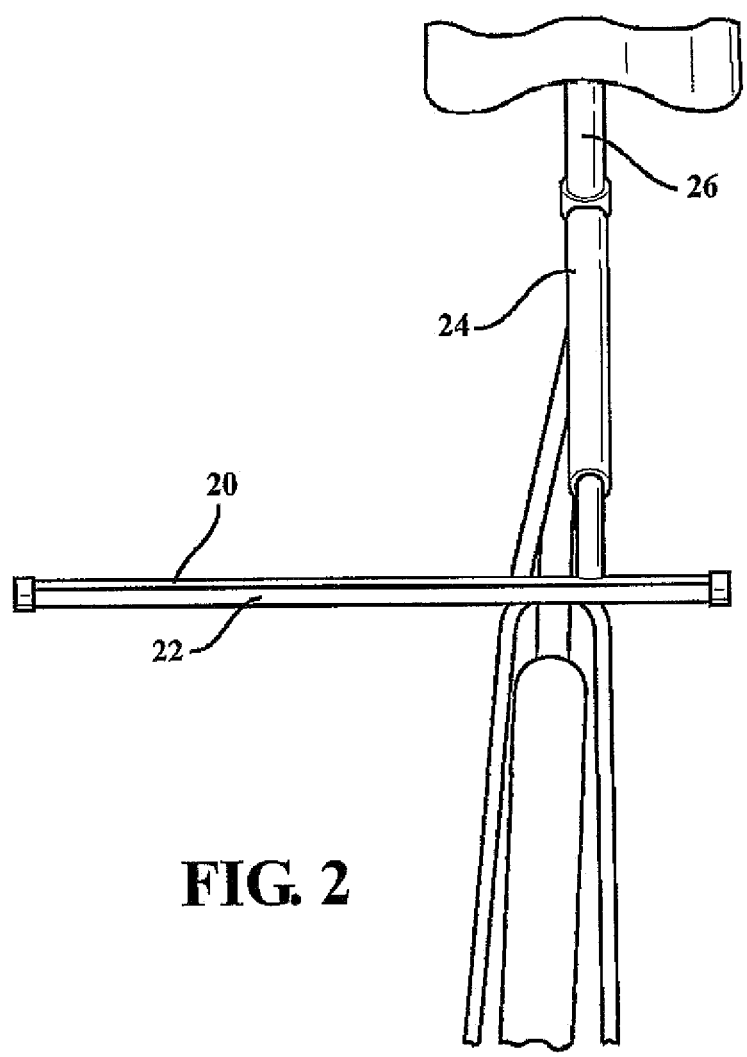
FIG. 2 illustrates the relative position of the safety light as it is attached to the seat post of a bicycle.

FIG. 2 more clearly shows the relative placement of light bar 20 with light diffuser 22 is attached by extender tube 24 to seat post 26. Within the light bar 20, there are many different aspects for flashing lights, steady lights, or any other type of indicating the light, which is shown through light diffuser bar 22.

Figure 3:
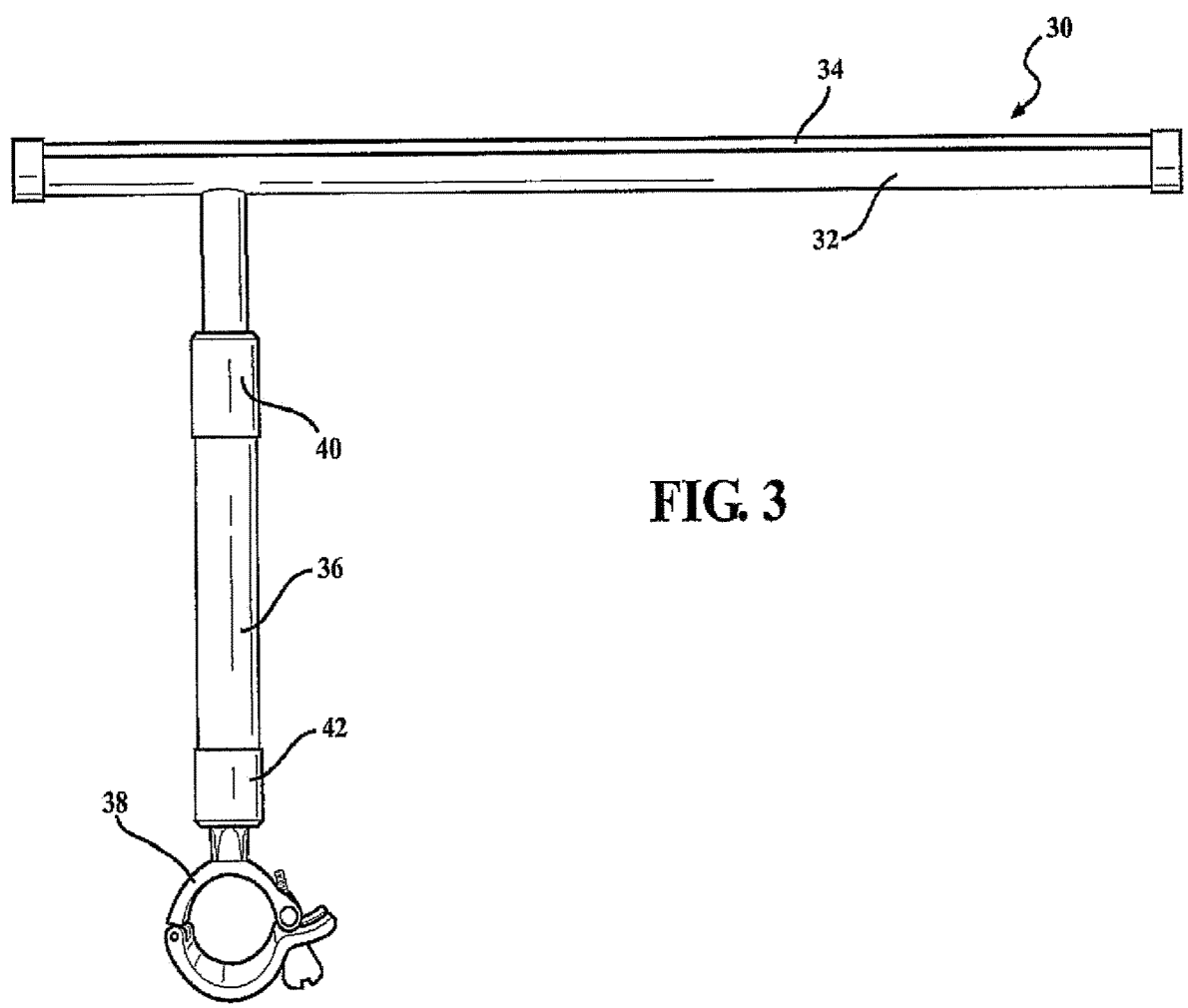
FIG. 3 is a top plan view of a safety light made in accordance with the present invention.

FIG. 3 is a top view of one of the preferred aspects of the safety light made in accordance with the present invention, generally denoted by numeral 30. Lightbar 32 includes a diffuser bar 34 for exposing light. Extension tube 36 may be adjusted by a knurled surface 40 and 42 for proper placement and alignment once it is attached to a seat post of a bicycle by clamp 38.

Figure 4A:
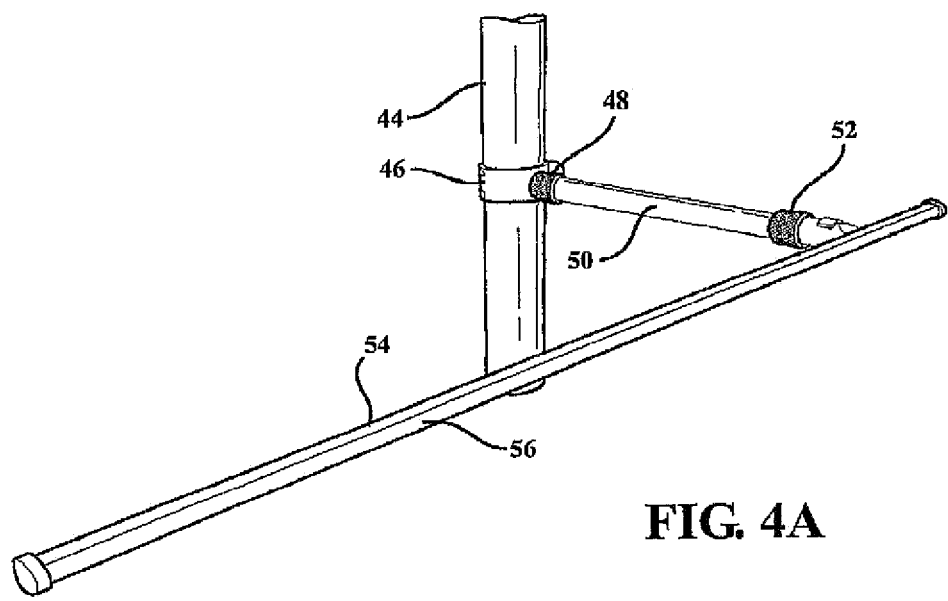
FIG. 4A is a side perspective view of a safety light in position on a seat post of a bicycle made in accordance with the present invention.

FIG. 4A illustrates a preferred position for lightbar 54 as it is attached to seat post 44 by clamp 46. Seat post adjustment 48 is located at the proximal end of extender tube 50, while a knurled surface rotational adjustment 52 can be adjusted while this bicyclist is on the seat, without having to get off the bike. Light diffuser bar 56 acts to aid in the visibility of LED lights which are contained within lightbar 54.

Figure 4B:
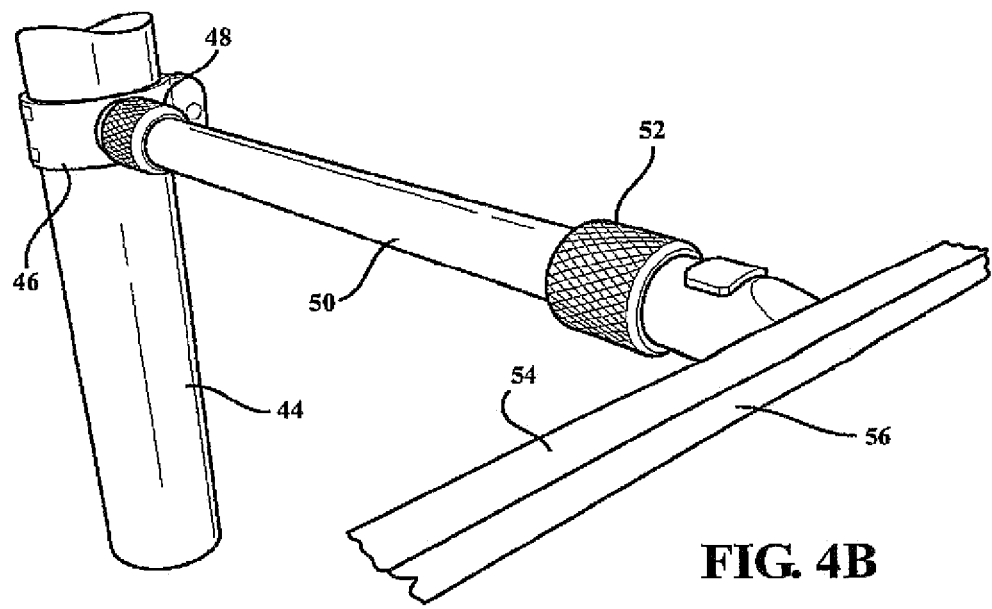
FIG. 4B is a close up view of the attachment and rotational mechanisms of a safety light made in accordance with the present invention.

FIG. 4B is a close-up view of each of the components shown in FIG. 4A. Again, the position of lightbar 54 can be adjusted by knurled rotational adjusters 48 and 52, both easily reachable and adjustable by a cyclist while he is position on the seat (not shown in this figure).

Figure 5:
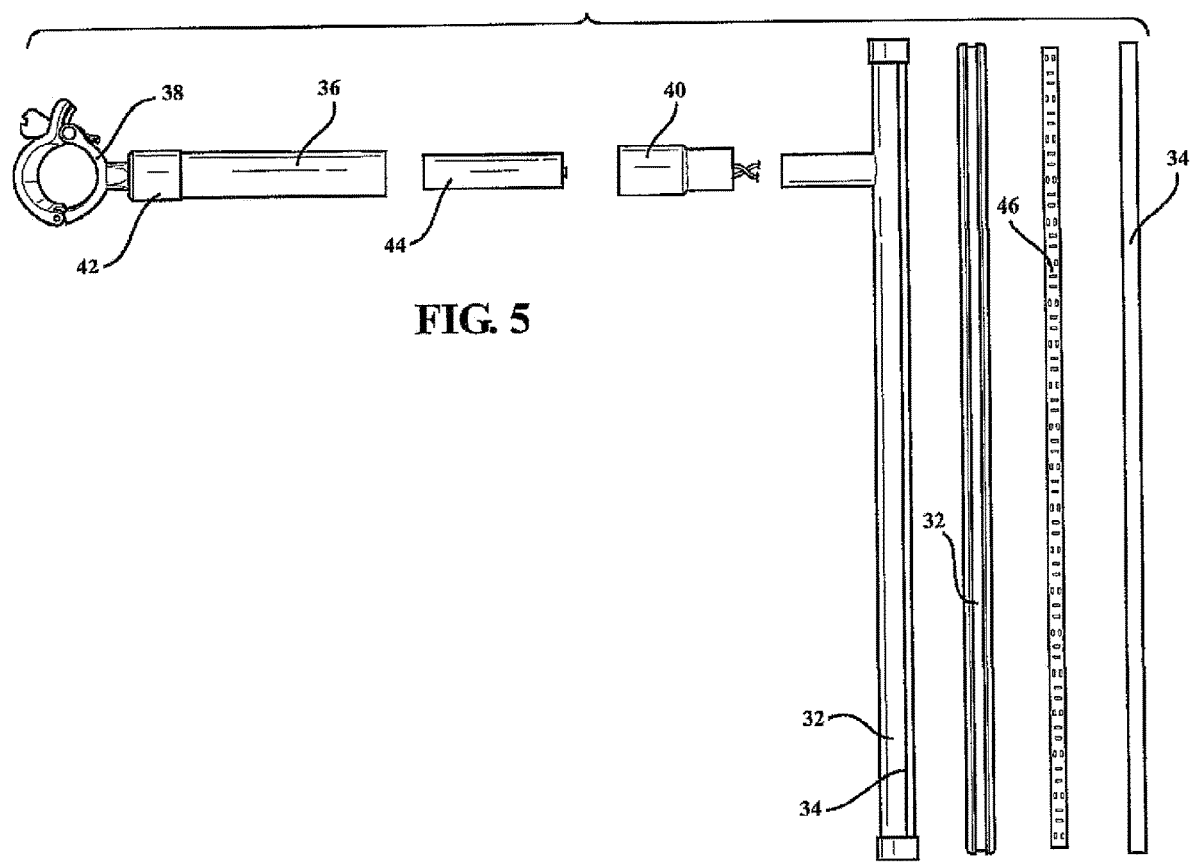
FIG. 5 is an exploded view of the components of a safety light made in accordance of the present invention.

FIG. 5 is an exploded view of all the components in this aspect of an example of a safety light made in accordance with the present invention, wherein light post 32 is adapted to receive a strip of LED lights 46 and then be covered by diffuser bar 34. Seat clamp 38 is adjustable and positionable by rotational adjuster 42 with regards to extender tube 36. Extender tube 36 also acts as a housing for a battery 44, whether rechargeable or not. Lightbar rotational adjuster 40 is shown attached to a portion of a lightbar, seeing more fully in detail below. Lightbar 32 is shown assembled and concealing the LED lights underneath diffuser bar 34.

Figure 6A:
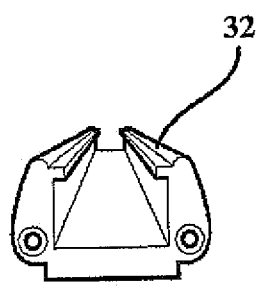
FIG. 6A is an end view of an LED light securement channel made in accordance with the present invention.
Figure 6B:
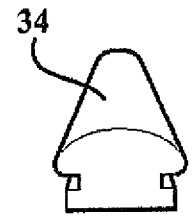
FIG. 6B is an end view of a light diffuser to be secured within the securement channel.

FIG. 6A is a side elevational view of the lightbar 32 having channels therein for receiving a strip of commercially available LED lights (not shown in this figure). Channels cut into lightbar 32 are adapted for receiving the diffuser bar 34 shown in FIG. 6B. As one can see, the light diffuser bar 34 helps to project the light from the LED lights to make it more visible to passing motorists.

Figure 7A:
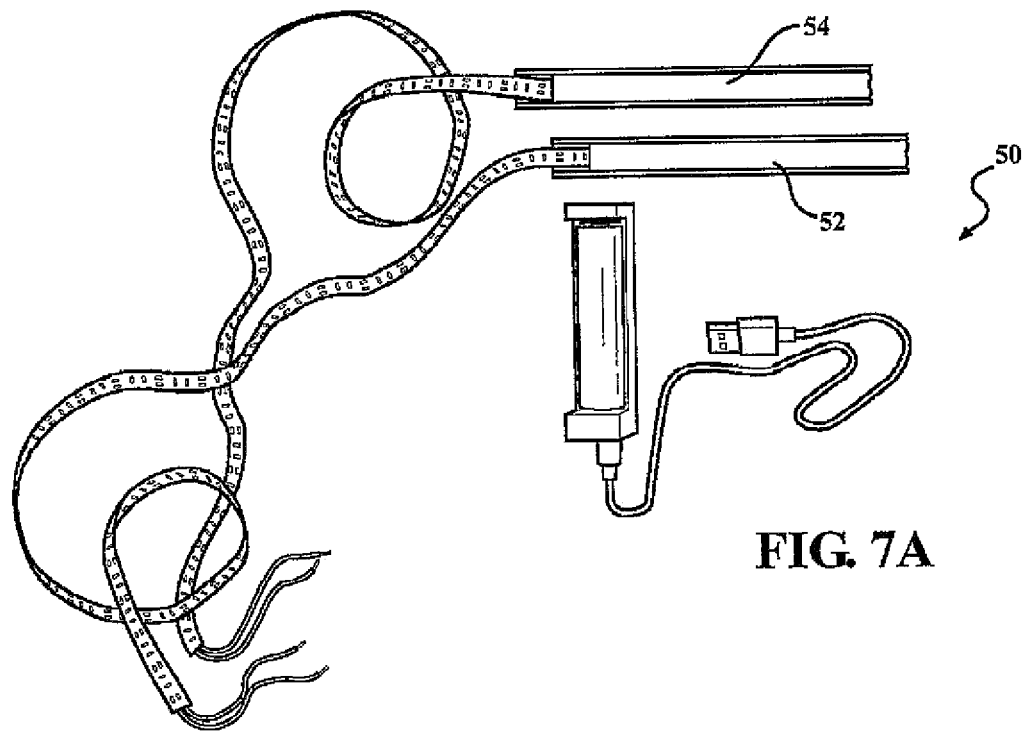
FIG. 7A is a deconstructed view of another aspect of an example of a safety light made in accordance with the present invention, including several different lights facing opposite directions.
Figure 7B:
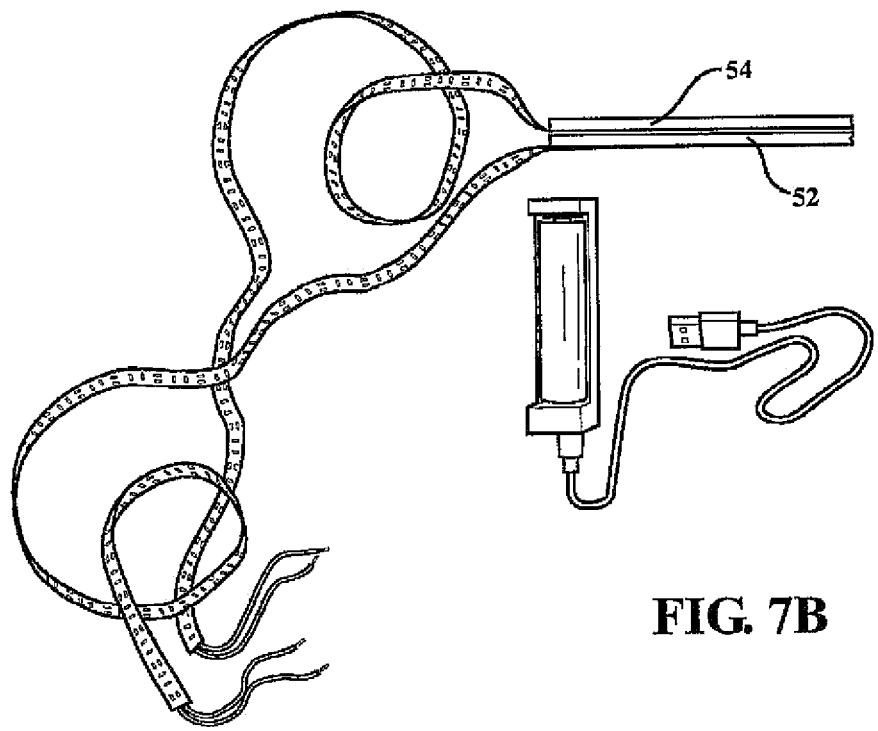
FIG. 7B shows the aspect of FIG. 7A in a constructed format.

With collective reference to FIGS. 7A and 7B, there is shown yet another aspect of an example of a safety light made in accordance with the present invention which includes a two-sided light source generally denoted by numeral 50, and including a channel for a red light 52, and a white light 54. FIG. 7A shows a deconstructed light assembly, while FIG. 7B shows the construction of an assembled dual light bar.

In the manufacture of the instant light bar, each of the four (4) components may be manufactured to specifications that provide strength and durability. Each item can be manufactured by designing a mold and using materials such as plastic, metal, aluminum, carbon or a form of flex steel or flex plastic or a combination thereof. All of the components will be made of materials which are weather proof or weather resistant.

The light bar preferably contains a maximum number of LEDs, with cutouts to provide 360 degrees of visibility and be manufactured to be rigid, telescoping or with flexible material that will hold its shape and orientation when adjusted.

Figure 8A:
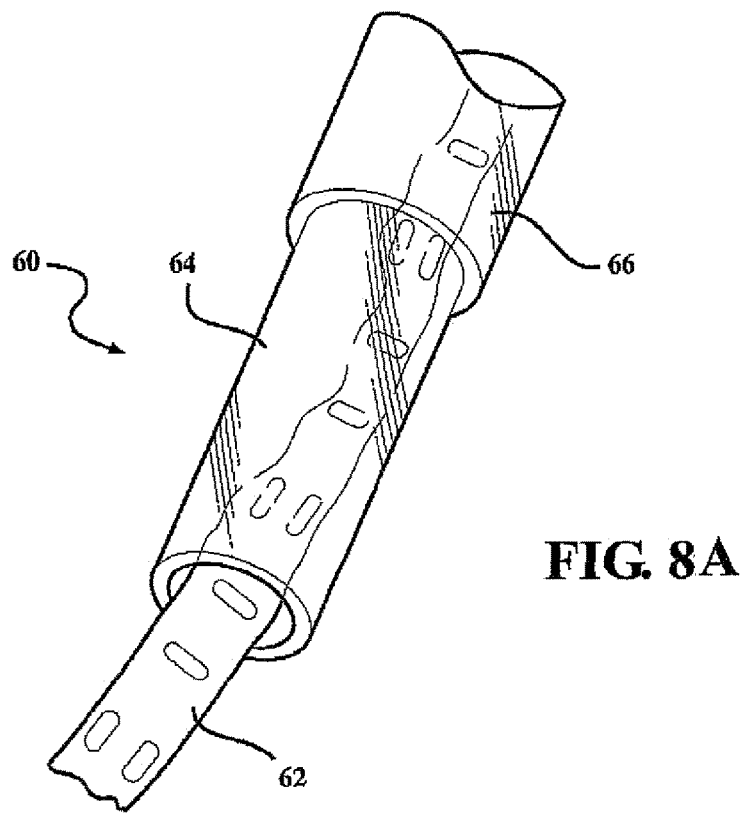
FIG. 8A illustrates yet another aspect of an example of a safety light made in accordance with the present invention including a transparent housing for a bendable light bar.
Figure 8B:
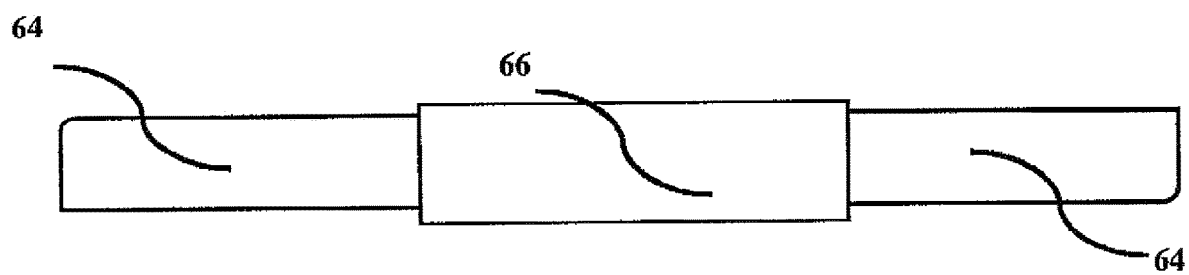
FIG. 8B is a side elevational view of the housing of FIG. 8A with a semi-rigid portion for stiffness.

Regarding the flexible light bar aspect shown in FIGS. 8A and 8B, this design variation is preferably made of a reinforced clear plastic tube encasement that allows for semi-rigidity with bendability. Most preferred in this example of a safety light made in accordance with the present invention is an 18" long primary first clear plastic tube that holds the LED lights in place. This tube is preferably semi-rigid, but easily bendable under gentle pressure. Sleeved thereover is a second clear plastic tube which encapsulates the first tube at the center to create full solid rigidity for 4 to 9 inches in the center, yet allows easy bendable semi-rigidity for the entire 18" length as both ends easily bend under direct pressure. This renders the light bar to be safe for children, as they can bump into the flexible light bar without hurting themselves. Furthermore, this aspect is adapted to bending easily under gentle pressure if bumping into a pedestrian, vehicle, or cyclist, or as the bike is laid down, and results in little or no damage if the bike is dropped or knocked down onto hard pavement. The second clear plastic layer should have minimal impact on lumens from center area, as scratching and scuffing of soft plastic should not impact the lumens emanating from the first clear tubing to a great degree.

With regards to the preferred light assembly, light bars of various lengths may include 2 strips of light attached to a single Light Bar rod as shown in FIGS. 7A and 7B. In this aspect, one strip faces forward to be seen by vehicles approaching from the front, while another LED light strip may be a rear facing strip of light to be seen by vehicles approaching from the rear. Light strips can be of various colors including but not limited to red, white, yellow, orange, blue, pink, etc.

Furthermore, both light strips may have 3 optional settings: steady light, slow flashing/slow blink light, and fast flashing/blinking light (s), with options of various intensities of light from low level of lumens to a maximum level of lumens allowed by law. These various modes of lighting may be activated by applying the brakes, or by a car getting too close, or by manual manipulation, among others.

FIG. 8A shows yet another aspect of an example of a safety light made in accordance with the present invention, including a bendable lightbar configuration generally denoted by numeral 60, including a strip of LED lights 62 that are commercially available, encased by a first flexible transparent plastic tubing housing 64, which is in turn sleeved thereover by a second semi—rigid clear tubing housing 66. This aspect of being bendable is a further safety feature of the present invention because it should not cause any harm when it comes into contact with a child, or a vehicle, or the like.

FIG. 8B illustrates the relative placement of the first flexible transparent plastic tubing housing 64 within the second semi-rigid clear tubing housing 66.

FIG. 9 illustrates another aspect of the present invention showing telescopic positioning of my safety light generally denoted by numeral 70, including a first horizontal telescopic pole 72 attached to a second vertical telescopic pole 74 by a motor housing 76. First telescopic pole 72 is attached underneath seat 80 by a t-mount 78. T-mount 78 may be attached to the seatpost with or without a breakaway. A portion of the telescoping pole 72 includes a tube which will extend the rear assembly to a position over and above back tire positioned approximately above a vertical line from rear axle, although not past the end of the rear tire.

Further looking at FIG. 9, vertical telescopic pole 74 may be a red flashing beacon seen as if standing behind the rear of the bicycle; shown herein as an extended 24" telescopic extension.

Preferably, telescoping beacon light 82 has 3 main swivel positions, ie. left-center-right. A "break-away" joint that falls away on near "feather touch" is described more fully hereinbelow.

One example of a break-away magnetic swivel joint is embodied as an ultra-light telescoping tube that adjusts from 0 inches to 36 inches. In this preferred embodiment, one small, light-weight, 360 degree bright flashing red light screws onto a single, small, long-life AAA battery with a tiny on/off button. Preferably, light 82 is weather proof like outdoor lights. To activate the breakaway feature of the magnetic swivel joint when anything bumps into the light 82 while in horizontal position, the light tube 82 instantly falls away from the pressure with near zero force impact. Once an object has bumped my safety light, even with near zero force, the impact would not effect the cyclist's momentum. As a safety feature, once "bumped", the safety light 82 would fall limp, but would be held onto the cycle by a tiny wire. Therefore, light 82 never leaves the cycle and never hits the road. Upon stopping, the cyclist simply "snaps" the light back into its base.

Some versions of the invention will have a "feather touch" break-away feature, such that any amount of pressure applied against the light bar when sticking out at a 90 degree angle from the bicycle's central axis will cause the light bar to "break-off" in order to avoid damage to any object to which the light bar might come into contact. This has many benefits including not harming a child, or other pedestrian, another object such as a car, but it also protects the rider from receiving any pressure that can push the rider off balance.

Looking collectively next to FIGS. 10A and 10B, this magnetic breakaway feature has been successfully tested by using complementary magnets at the intersecting joint of the light bar and the extension tube to which it is attached. See the description of the extension tube under FIG. 11 hereinafter. The slightest pressure can cause the magnets to separate and easily break away from each other. The breakaway magnet fixture is generally denoted by numeral 90, and illustrates magnets 92, and electrical connectors 94, all within a weatherproof connector body 96. A wire (not shown) keep the light bar connected to the bicycle after breaking away, so as not to leave the light bar behind on the street.

While the light bar may be made of a bendable plastic tube reinforced in its center to yield to pressure, the present invention also envisions an optional spring hinge between the light rod and the swivel to also yield under pressure.

Figure 11:
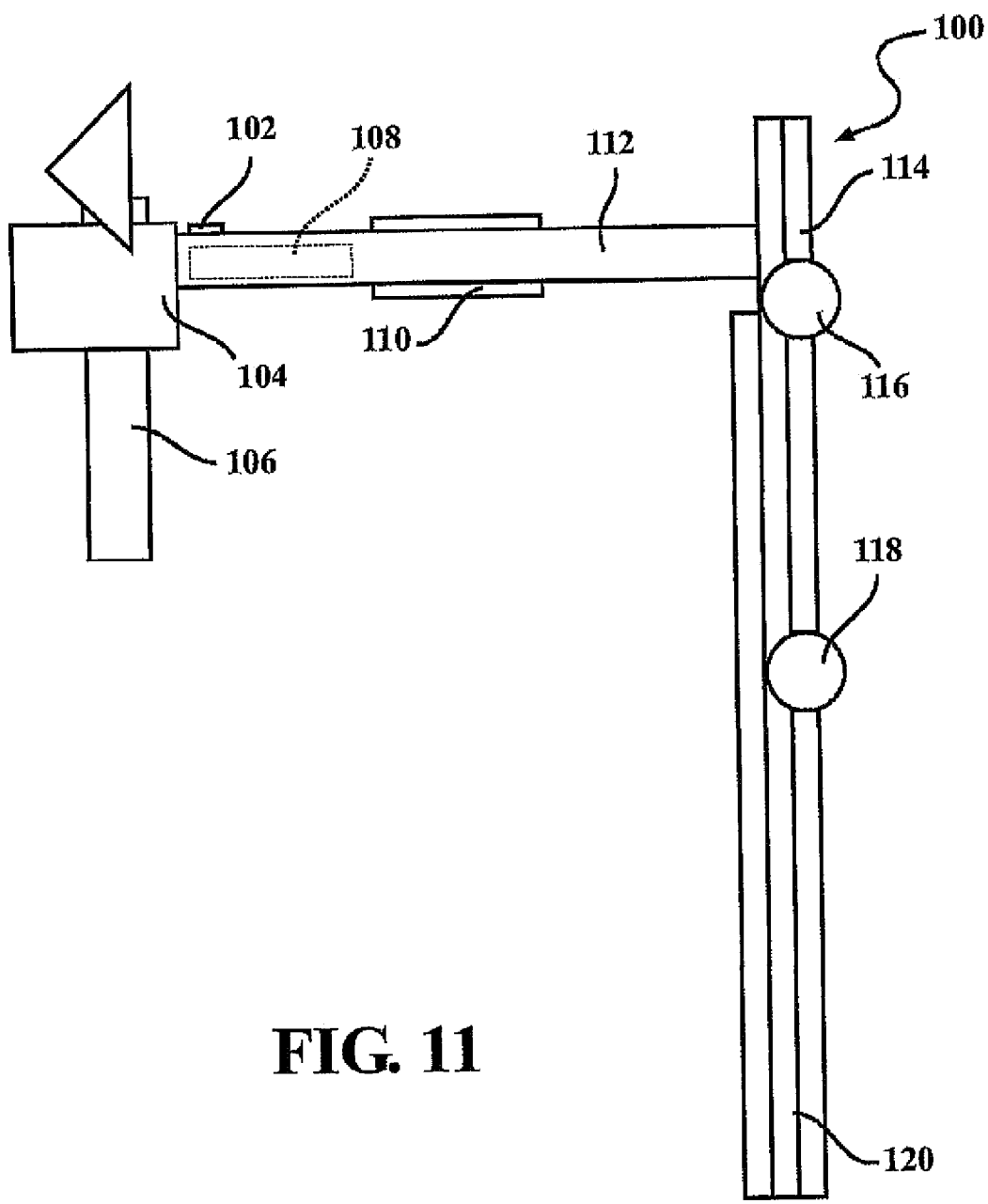
FIG. 11 is a diagram of the various preferred components made in accordance with the present invention.

Now turning to FIG. 11, which shows a schematic representation of the top plan view of a preferred assembly 100. Assembly 100 may include a seat post mode button 102 to control how and which lights are to be displayed. Its location means that it can be operated while the bicycle is moving. Merely reach the button 102, flick it until your desired light pattern comes up and let it shine. A T-mount 104 secures the light bar assembly 100 to seat post 106. A battery 108 is located within extension tube 112, also the home of side lights 110. A red and/or orange light 114, preferably LEDs, faces rearwardly. A bending point 116 allows for a 180 degree bend to prevent breaking. I envision that this may be a good location for the breakaway magnet concept. Such magnets are preferably low Gauss value ferromagnets, exhibiting just enough force to keep the light bar assembly 100 on the bicycle, but loose enough to break away easily when struck. In some aspects, a second joint 118 may also be advantageous. A rod 120 may be available for supporting LED lights.

Figure 12:
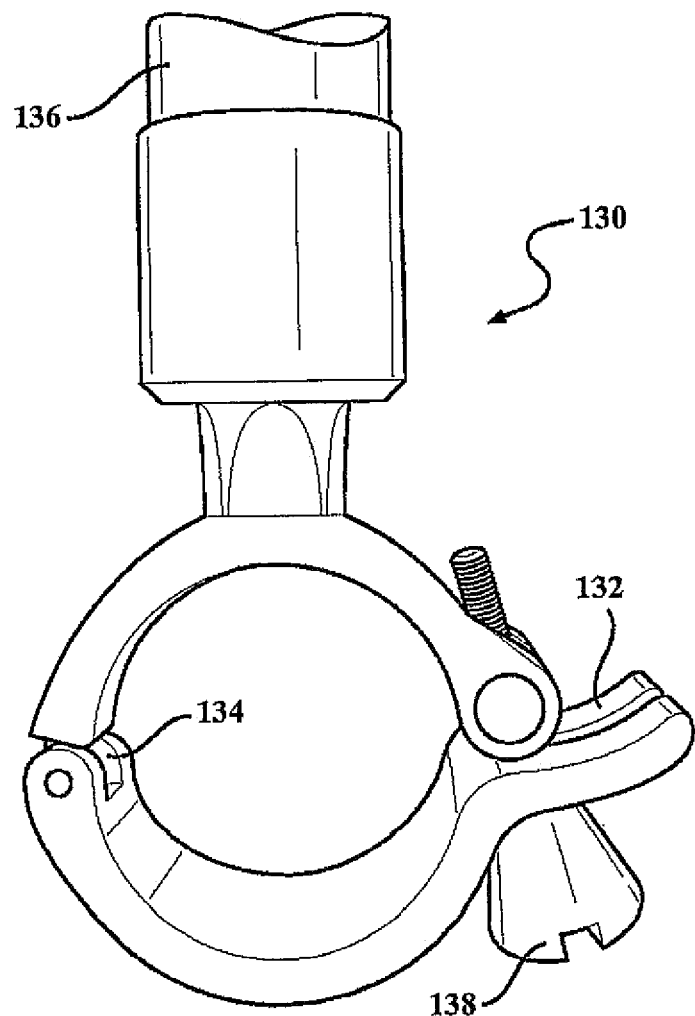
FIG. 12 is a top plan view of an aspect of a suitable seatpost clamp.

And finally we look at FIG. 12, showing a suitable seat post clamp 130, including a clamp portion 132 secured by hinge 134 to light bar extension tube 136. A clip on lock 138 secures seat post clamp 130 to a seat post (not shown here) underneath a bicycle seat. This seat post clamp 130 also may act as a support truss to bear the weight of the extension tube 136. The extension tube 136 may be made of an unbreakable molded T-shaped PVC pipe tubing that acts as a female to receive a male extension tube, especially in my telescoping applications. Further, seatpost clamp 130 also acts as a support truss to bear the weight of the extension tube. Also allows removal of my safety light without having to unclamp it from the seatpost as a security feature when a rider temporarily parks his bicycle. This allows for quick removal of my safety light without having to unclamp the assembly 130 from the seatpost. This is especially advantageous as a security feature when a rider temporarily parks his bike, and needs to prevent theft by removing accessories and take them with him. A quick disconnect is always more convenient than having to disassemble something.

As a further safety aspect, the present invention may include a Collision Avoidance Sensor, the CAS, which is part of the Collision Avoidance System detecting vehicles approaching from behind the bike. This sensor can trigger the light bar to flash in various manners when a vehicle is approaching from behind. In yet another aspect, the lights of the light bar may be programmed to flash faster and faster as a car gets closer and closer to the bicycle, or the lights of the light bar can be programmed to flash in various colors including red, orange, yellow, white or blue as a car approaches from behind.

The present invention may also include within its Collision Avoidance System a built-in artificial intelligence, AI, to inform the cyclist in human speech via Bluetooth to a specially designed headset or via a Bluetooth enabled earpiece as to how fast a rear approaching vehicle is coming, how big the vehicle is, and the percentage of likelihood of a collision with the cyclist. The CAS can trigger the light bar to synchronize the flashing of the light bar lights so that the light bar lights can flash from right to left or left to right.

Furthermore, the AI of the CAS can trigger various ringing tones, generated from a ringer within the body of the light bar system and also send a customizable ring tone via a synchronized Bluetooth-based headset (or ear pods) of the cyclist, based on the size and speed of a vehicle approaching from behind. It is also envisioned that the CAS, with its built-in artificial intelligence, that can tell the difference between a rear approaching vehicle or a rear approaching bicycle and can signal that information via a ring tone and or a human voice message to the cyclist via a Bluetooth headset or a Bluetooth enabled earpiece.

An information screen can attach to the handlebar of the bicycle that receives signals from the Collision Avoidance Sensor, the CAS and displays approaching vehicle information and gives information about the likelihood of collision on the screen. The information screen may also receive biometric signals from the cyclist's heartbeat via a sensor attached to the handlebar of the cycle or attached as a transmitting device attached to the body of the cyclist, typically the wrist and/or the chest.

The present invention also envisions an optional feature which provides an auto extender/telescoping light bar that can telescope via the press of a button or a Bluetooth signal activated by the cyclist using her/his voice via the system's AI voice recognition system that controls the light bar's extendability to go from 0 inches extension from the bike out to a full extension of 36 inches and all lengths in between.

There are more than 200,000 non-fatal injuries that have occurred over the years just in the U.S. The deaths and fatalities around the world are a much larger number and the safety light may also help prevent fatalities and injuries around the globe.

Various energy sources are suitable for my safety light. The amount of energy needed to support the light source of the safety light may be derived from various sources including but not limited to replaceable battery(ies), rechargeable battery(ies), battery(ies) rechargeable using USB, micro-USB or other connecting devices to a charging source, solar power, motion power transferred from moving bicycle mechanism or mechanism responding to athlete's motion, wireless charging devices, various types of charging stations, and other energy providing system(s).

In addition, there are many ways to attach the safety light to the athlete or the athlete's transportation device, e.g., a bicycle, a motorcycle, a pedestrian runner, or other outdoor terrain vehicles. For example, the safety light can be attached to the athlete's waist, a bicycle's seatpost, a bicycle's front handlebar, and any motorcycle or small terrain vehicle's front frame or rear frame. The mounting mechanism can include such devices as a clamp that is screwed on, lever-clamped, welded, manual tightened-down system, clipped-on, strapped on, twisted on, molded in place, rubberized flexible clamp for different seatpost size and shape snap on, a molded unbreakable T-shaped device made with plastic or other material with the top of the "T" encircling a bicycle's seatpost and the "leg" of the "T" acts as an unbreakable "female" receiving tube that receives the "male" extension tube which is attached to the light system, and other attachment options.

Some safety light designs would allow for the user to have an easily detachable feature from any bicycle, motorcycle, or other smaller-than-automobile vehicle, thus increasing the security and safety of the invention from theft.

One aspect of the safety light when used on a bicycle is that it has an extension support tube that causes the safety light to sit back and away from a bicycle's seat post. This aspect has many benefits including expanding the cyclist's visual foot print, preventing interference with riders pedaling motion, and preventing interference of the safety light's functionality by a rider's backpack whether the safety light is in the left, right, straight back, or straight up position, and prevents the view of the lightbar of the safety light from being blocked by the seat, buttocks, or back pack allowing for greater visibility and safety.

One aspect of the safety light includes a telescoping feature that uses various methods of telescoping such as manual, actuator driven, or other any other suitable telescoping methodology.

The invention can be configured to swivel into four different directions including vertical, left, right, straight back and variations in between those positions. Some versions of the invention can fold up to a very narrow profile that sits directly above or along the side of the rear tire (of a bicycle for example) and take up less width than the bicycle's seat to allow for narrow passages, narrow parking, bike stalls, riding on sidewalks with nearby poles for signs or lights, and areas busy with cyclists or pedestrians. Variations of the invention will have rear facing red LEDs that can dramatically increase in brightness when the cyclist or other vehicle using the invention applies it brakes.

Yet another aspect of the safety light allows for swivel joints that can be placed where the light bar and the extension tube meet to allow for instant collapsibility if met with any opposing force to prevent damage to safety light and any object to which it may come into contact.

In summary, numerous benefits have been described which result from employing any or all of the concepts and the features of the various specific aspects of the present invention, or those that are within the scope of the invention. The safety light acts perfectly as a collision avoidance device.

The foregoing description of some preferred aspects of the invention have been presented for purposes of illustration and description. This disclosure is not intended to be exhaustive or to limit the invention to the precise form disclosed. Obvious modifications or variations are possible in light of the above teachings with regards to the specific aspects. These aspects were chosen and described in order to best illustrate the principles of the invention and its practical applications to thereby enable one of ordinary skill in the art to best utilize the invention in various aspects and with various modifications as are suited to the particular use contemplated. It is intended that the scope of the invention be defined by the claims which are appended hereto.

What is claimed is:

1. A safety light assembly for securement to a bicycle having a bicycle seat and a bicycle seat post, comprising:
   an extended light bar which is attachable to a bicycle under the bicycle seat, such that on the bicycle seat post, the extended light bar providing 360° of visibility with the light being visible from all sides of the bicycle, including from the rear, sides and front and being manufactured of a flexible material that will hold its shape and orientation, such that the extended lighted bar extends a distance toward a roadway next to where the cyclist is traveling;
   the extended light bar made of a first semi-rigid reinforced clear plastic tube encasement holding the extended light bar in place, but easily bendable under gentle pressure, the extended light bar having different lighting aspects for flashing lights, steady lights, and other types of indicating lights showing through the extended light bar;
   a second clear flexible plastic tube sleeved over the first clear plastic tube; and
   a seatpost clamp for securing the safety light assembly to the bicycle seat post
   whereby a motorist is shown a safe distance to avoid encroaching on the bicyclist to avoid collision.

* * * * *